United States Patent [19]
Rabinovich et al.

[11] Patent Number: 5,592,621
[45] Date of Patent: Jan. 7, 1997

[54] SYSTEM FOR INSERTING FIRST TRANSMISSION TOKEN INTO DATA STREAM APPENDED TO SECOND TRANSMISSION TOKEN TO FACILITATE FULL DUPLEX COMMUNICATION BETWEEN CENTRAL CONTROLLER AND OTHER CONTROLLERS

[75] Inventors: Daniel Rabinovich, Plainville; Henry Steinberg, Westboro, both of Mass.

[73] Assignee: EMC Corporation, Hopkington, Mass.

[21] Appl. No.: 285,345

[22] Filed: Aug. 3, 1994

[51] Int. Cl.$^6$ ....................................... G06F 13/00
[52] U.S. Cl. ................. 395/200.02; 364/222.2; 364/284.3; 364/284.4
[58] Field of Search .............. 395/200.01, 200.02, 395/200.03, 200.05; 370/94.1, 60, 85.13, 85.4, 85.15, 95.1

[56] References Cited

U.S. PATENT DOCUMENTS

| | | | |
|---|---|---|---|
| 4,611,274 | 9/1986 | Machino et al. | 395/200.01 |
| 4,837,762 | 6/1989 | Wachi et al. | 370/89 |
| 4,845,609 | 7/1989 | Lighthart et al. | 395/200.01 |
| 4,985,888 | 1/1991 | Madge et al. | 370/85.5 |
| 5,029,159 | 7/1991 | Dolev | 370/85.5 |
| 5,077,732 | 12/1991 | Fischer et al. | 370/85.4 |
| 5,140,586 | 8/1992 | Kloper et al. | 370/85.5 |
| 5,140,587 | 8/1992 | Mueller et al. | 370/85.15 |
| 5,253,252 | 10/1993 | Tobol | 370/85.5 |

*Primary Examiner*—Thomas C. Lee
*Assistant Examiner*—Moustafa Mohamed Meky
*Attorney, Agent, or Firm*—Daniel J. Bourque; Kevin J. Carroll

[57] ABSTRACT

A system and method of providing an embedded controller network communication protocol, for controlling communications between a central controller and a plurality of active embedded controllers, wherein a first data transmission token (T2) is passed, under control of the central controller, from the central controller to an active embedded controller, back to the central controller, and then sequentially from the central controller to and from each coupled active embedded controller. Any active embedded controller may return data to the central controller only appended to the first token. A second data transmission token (T1) addressed to one active embedded controller is broadcast from the central controller to all of the active embedded controllers, with a data stream to be transmitted from the central controller to the addressed active embedded controller appended to the second data transmission token (T1). The first data transmission token (T2) is inserted between data bytes of a data stream appended to the second data transmission token to provide full duplex communication.

31 Claims, 9 Drawing Sheets

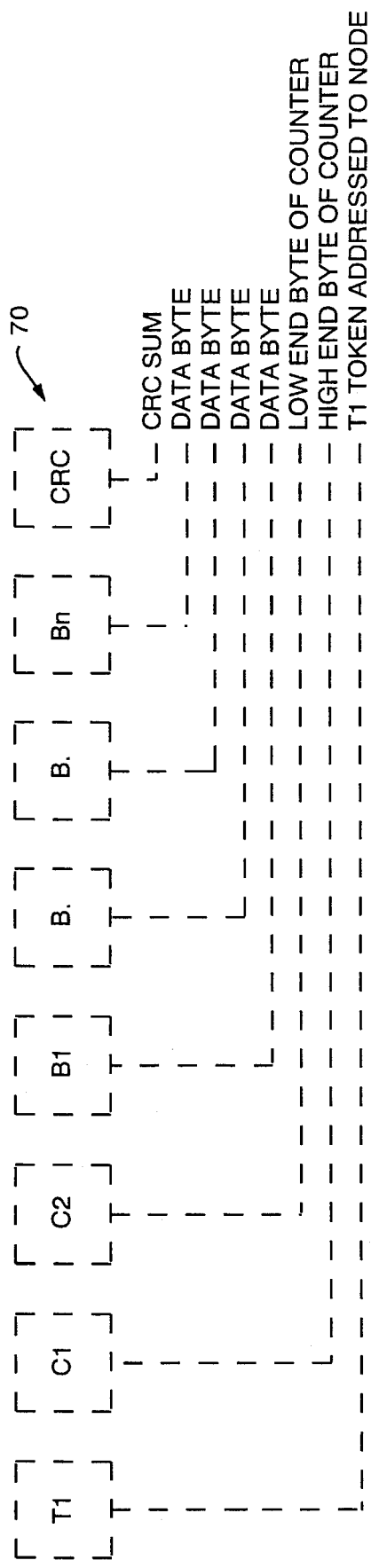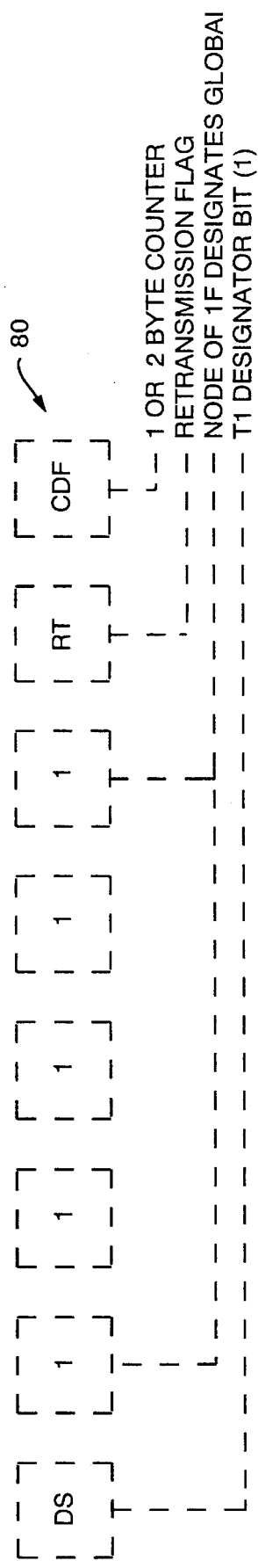
FIG. 3C
FIG. 3D

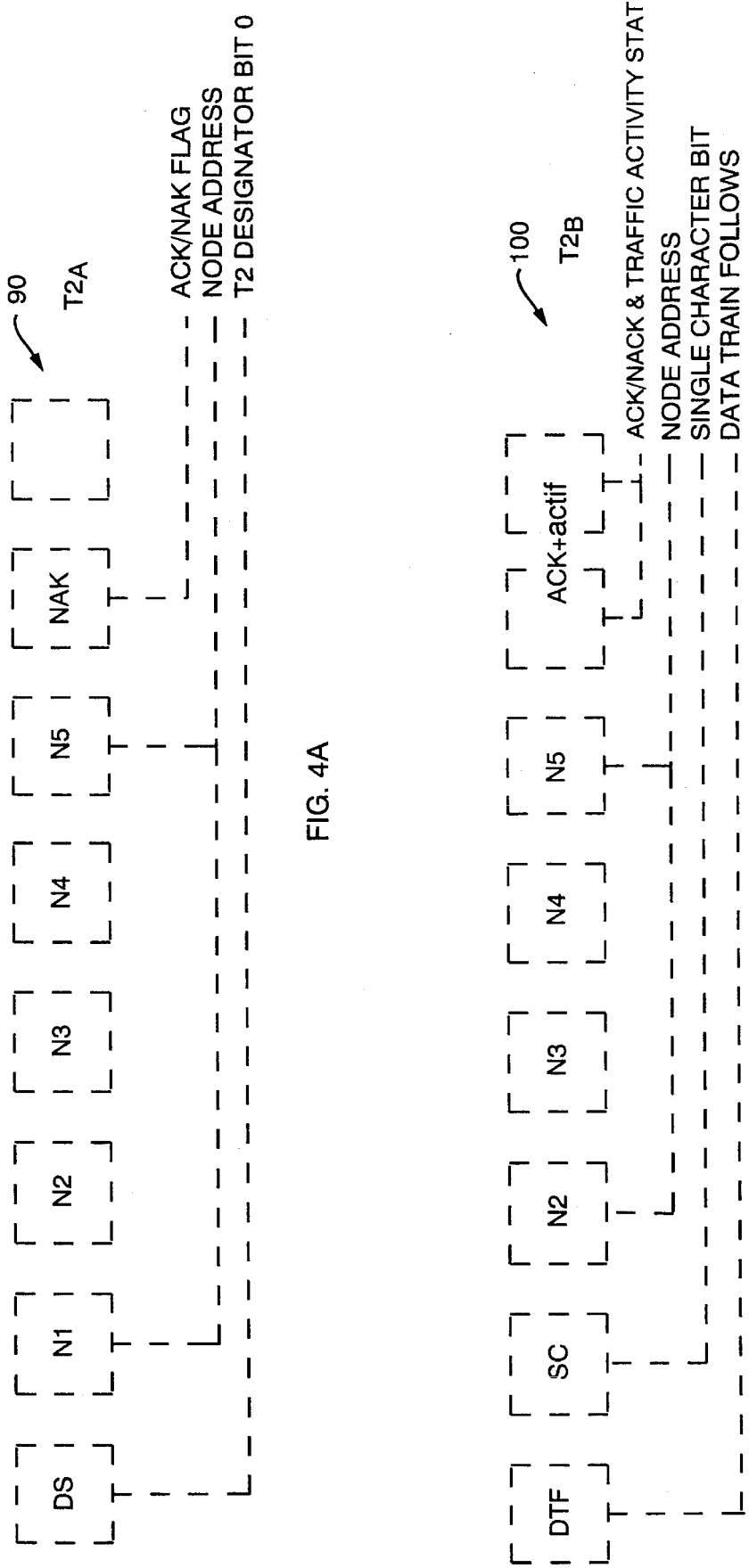

5,592,621

SYSTEM FOR INSERTING FIRST TRANSMISSION TOKEN INTO DATA STREAM APPENDED TO SECOND TRANSMISSION TOKEN TO FACILITATE FULL DUPLEX COMMUNICATION BETWEEN CENTRAL CONTROLLER AND OTHER CONTROLLERS

FIELD OF THE INVENTION

This invention relates to a system and method for accomplishing an embedded controller network that provides for full duplex communications between a central controller and remote embedded controllers.

BACKGROUND OF THE INVENTION

In the testing of complex, interactive systems, it is necessary to isolate and individually test each of the small parts of the system, as well as to test the interaction between those parts in a manner which emulates the system operation. Data storage systems are one example of such complex, interactive systems. For such systems compatible with mainframe computers manufactured by International Business Machines Corporation, the systems have a number of separate controllers, often called "directors", each having a CPU. Each director must be tested to make sure it has the proper functionality, alone and in conjunction with the remainder of the system.

The testing of such systems is typically accomplished with the use of a separate personal computer which controls the testing of the individual directors, as well as the interaction among the directors at the system level. Typically, each director has test code resident therein. The PC thus needs to be able to receive data and status indications from each of the directors, and to send data to each of the directors, in order to coordinate the director's test routines, and to accomplish the interactive director testing. It is thus necessary to provide a network which connects the test PC to each of the sixteen directors.

One manner of accomplishing this has been to use a sixteen pole switch which physically connects the PC to only one director at a time. This system was slow and resulted in frequent miscommunication due to the fact that proper communication required the timing between the switch operation and the operation of the PC and/or each of the directors to be exactly synchronized.

The switch can be eliminated by providing a network connecting the PC to the directors. This type of network is known as an embedded controller network, in which there are a number of controllers (the directors) under control of commands from a central control computer (the PC). It is the aim of such networks to accomplish fast, reliable communication with relatively low token-passing overhead time. It is also desirable in such systems to accomplish full duplex communications.

SUMMARY OF THE INVENTION

It is therefore an object of this invention to provide a system and method for quickly and reliably allowing the testing of a number of embedded controllers.

It is a further object of this invention to provide such a system and method which allows for full duplex communication in an embedded controller network.

This invention features a method of accomplishing an embedded controller network to provide for communications between a central controller and a plurality of active embedded controllers, comprising the steps of: passing a first data transmission token under control of the central controller, from the central controller to an active embedded controller, back to the central controller, and then sequentially from the central controller to and from each active embedded controller; allowing any active embedded controller to return data to the central controller only appended to the first token; and broadcasting a second data transmission token addressed to one active embedded controllers from the central controller to all of the active embedded controller with data to be transmitted from the central controller to the addressed active embedded controller appended to the second token.

The method may further include the step of inserting the first token into the data appended to the second token to allow the first token to be passed more regularly to accomplish full duplex communication. The step of passing the first data transmission token may include addressing the token to one active embedded controller and broadcasting the addressed first token to all of the active embedded controllers. The embedded controllers may be directors in a data storage system. The data returned by an active embedded controller with the first token may be divided into eleven bit bytes which may include eight data bits, a start and a stop bit just before and after the data bits, respectively, and a parity bit after the stop bit.

The step of broadcasting the second token with appended data may include inserting a data byte counter between the token and the data to communicate the number of data bytes to follow the counter. The step of broadcasting the second token with appended data may further include adding a Redundancy Check Byte (RCB) at the end of the data bytes. The data byte counter may be one byte long, or two bytes long, with the first byte being the high end byte of the counter, and the second byte being the low end byte of the counter. The step of passing the first token may include beginning the first token passed from an active embedded controller back to the central controller with a bit indicating whether only a single byte, or more than one byte, of data follows the first token. The step of allowing an active embedded controller to return data may include inserting a data byte counter between the token and the data to communicate the number of data bytes to follow.

This invention further includes a method of providing communications between a central computer and a plurality of active embedded controllers, comprising the steps of: (a) addressing a first data transmission token to an active embedded controller; (b) broadcasting the addressed token to all of the active embedded controllers; (c) commanding the addressed active embedded controller to return the token to the central controller with either a status message or data appended to the token; (d) repeating steps (a) through (c) for each active embedded controller to allow each active embedded controller to periodically communicate with the central controller; (e) addressing a second data transmission token to an active embedded controller; (f) appending a string of data bytes to the second token; (g) broadcasting the second token and data string to all of the active embedded controllers; and (h) periodically inserting the first token into the data string between data bytes to accomplish step (b) more regularly and provide full duplex communication.

This invention also features a system providing communications between a central controller and a plurality of active embedded controllers, and includes means for passing a first data transmission token, under control of the central controller, from the central controller to an active embedded controller, back to the central controller, and then sequentially from the central controller to and from each active embedded controller; means for allowing any active embedded controller to return data to the central controller only appended to the first token; and means for broadcasting a second data transmission token addressed to one active embedded controller from the central controller to all of the active embedded controllers, with data to be transmitted from the central controller to the addressed active embedded controller appended to the second token.

The system may further include means for inserting the first token into the data appended to the second token to allow the first token to be passed more regularly to accomplish full duplex communication. The means for passing the first data transmission token may include means for addressing the token to one active embedded controller and broadcasting the addressed first token to all of the active embedded controllers. The embedded controllers may be directors in a data storage system. The data returned by an active embedded controller with the first token may be divided into eleven bit bytes; those data bytes may include eight data bits, a start and a stop bit just before and after the data bits, respectively, and a parity bit after the stop bit.

The means for broadcasting the second token with appended data may include means for inserting a data byte counter between the token and the data to communicate the number of data bytes to follow. The means for broadcasting the second token with appended data may further include means for adding an RCB byte at the end of the data bytes. The data byte counter may be one byte long, or the data byte counter may be two bytes long, with the first byte being the high end byte of the counter, and the second byte being the low end byte of the counter.

The means for passing the first token may include means for beginning the first token passed from an active embedded controller back to the central controller with a bit indicating whether only a single byte, or more than one byte, of data follows the first token. The means for allowing an active embedded controller to return data may include means for inserting a data byte counter between the token and the data to communicate the number of data bytes to follow.

This invention may alternatively include an embedded controller network system providing communications between a central computer and a plurality of active embedded controllers, including means for addressing a first data transmission token sequentially to each active embedded controller; means for broadcasting the addressed tokens one at a time to all of the active embedded controllers; means for requiring the addressed active embedded controller which has received a token to return the token to the central controller with either a status message or data appended to the token; means for addressing a second data transmission token to an active embedded controller; means for appending a string of data bytes to the second token; means for broadcasting the second token and data string to all of the active embedded controllers; and means for periodically inserting the first token into the data string between data bytes to pass the first token more regularly and provide full duplex communication.

DESCRIPTION OF THE DRAWINGS

These and other features and advantages of the present invention will be better understood by reading the following detailed description, taken together with the drawings wherein:

FIGS. 3B and 3C are schematic diagrams of the types of data streams appended to the token of FIG. 3A for the preferred embodiment of this invention;

FIG. 3D is a schematic diagram of this same token type addressed to all of the directors;

FIGS. 4A and 4B are schematic diagrams of the second type of data transmission token for the preferred embodiment of this invention as transmitted from the PC to a director, and from a director back to the PC, respectively;

DETAILED DESCRIPTION OF THE PREFERRED EMBODIMENT

Figure 1:
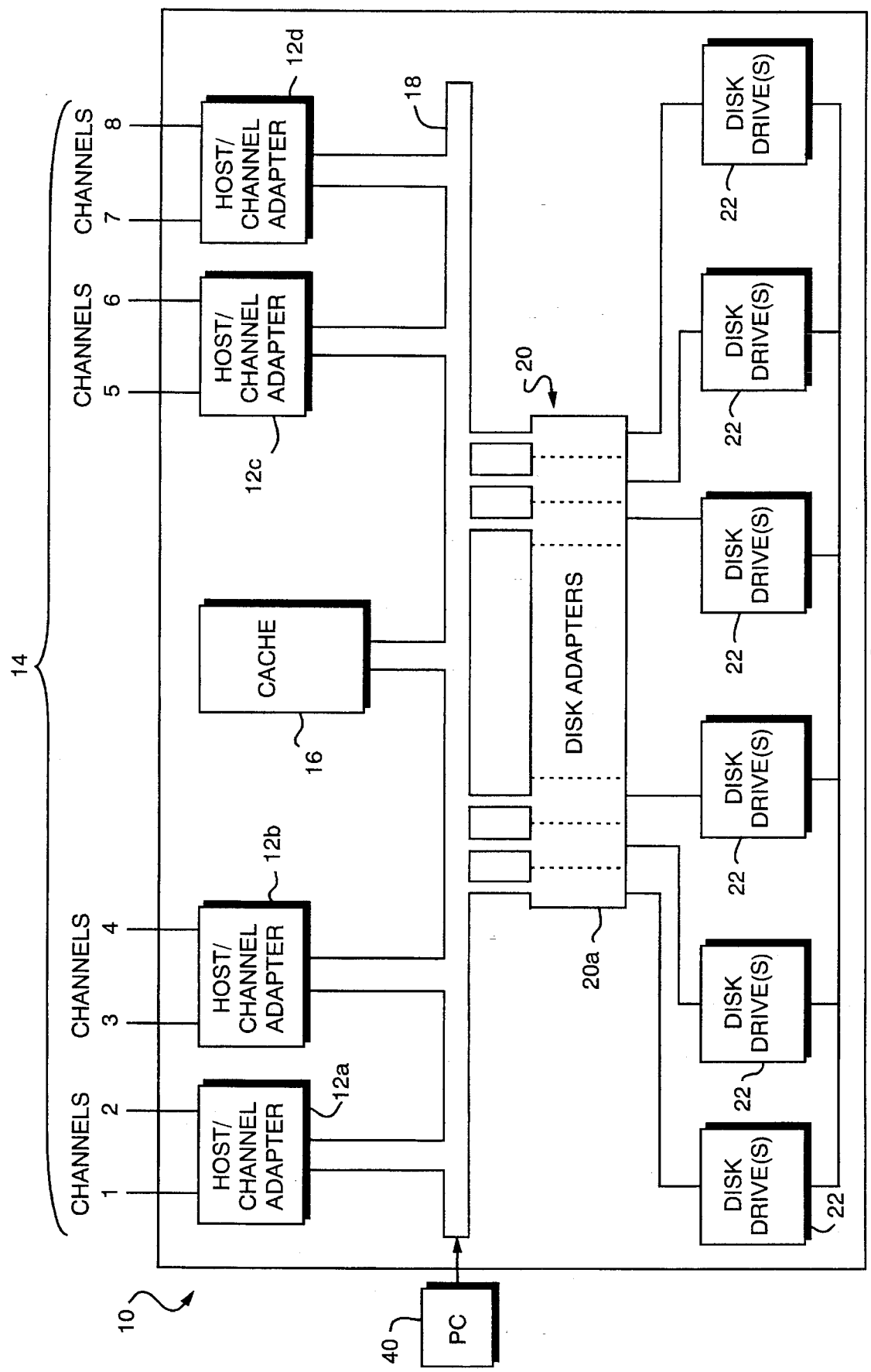
FIG. 1 is a schematic diagram of a data storage system with a plurality of controllers which may be tested using the system and method of this invention.

Disk data storage system 10, FIG. 1, is an example of a system having a number of separate controllers which need to be tested both individually and in terms of how they work together, for diagnosis and testing of the system. An exemplary data storage system 10 includes one or more means for receiving write commands and data, such as host/channel adapter 12a through 12d. These channel adapters are adapted to receive disk read/write commands and data over a plurality of communication channels such as channels 14 from one or more host computers, not shown, over lines 1 through 8.

Channel adapters 12a through 12d are operatively connected to temporary or cache semiconductor memory storage unit 16 by bus 18. Bus 18 is also operatively connected to one or more disk adapters 20 which read and write data to one or more disk drive units 22, each of which includes one or more disk drives. The operation of system 10 and the manner in which it accomplishes reading and writing of data is described in more detail in U.S. Pat. No. 5,206,939, incorporated herein by reference. The functionality of the channel and disk adapter boards may be combined on one physical board without departing from the present invention. This combined functionality module will hereinafter be referred to as a director.

Each host/channel adapter and disk adapter includes at least one processor, each of which is called a "director" in IBM-compatible systems. The system and method of this invention is directed to accomplishing a network capable of testing the directors quickly and efficiently. The testing is controlled by a separate computer 40, typically an IBM PC or compatible, which coordinates the operation of the test code resident in each director, and also accomplishes interactive testing between directors under control of a test routine resident in the PC.

Figure 2:
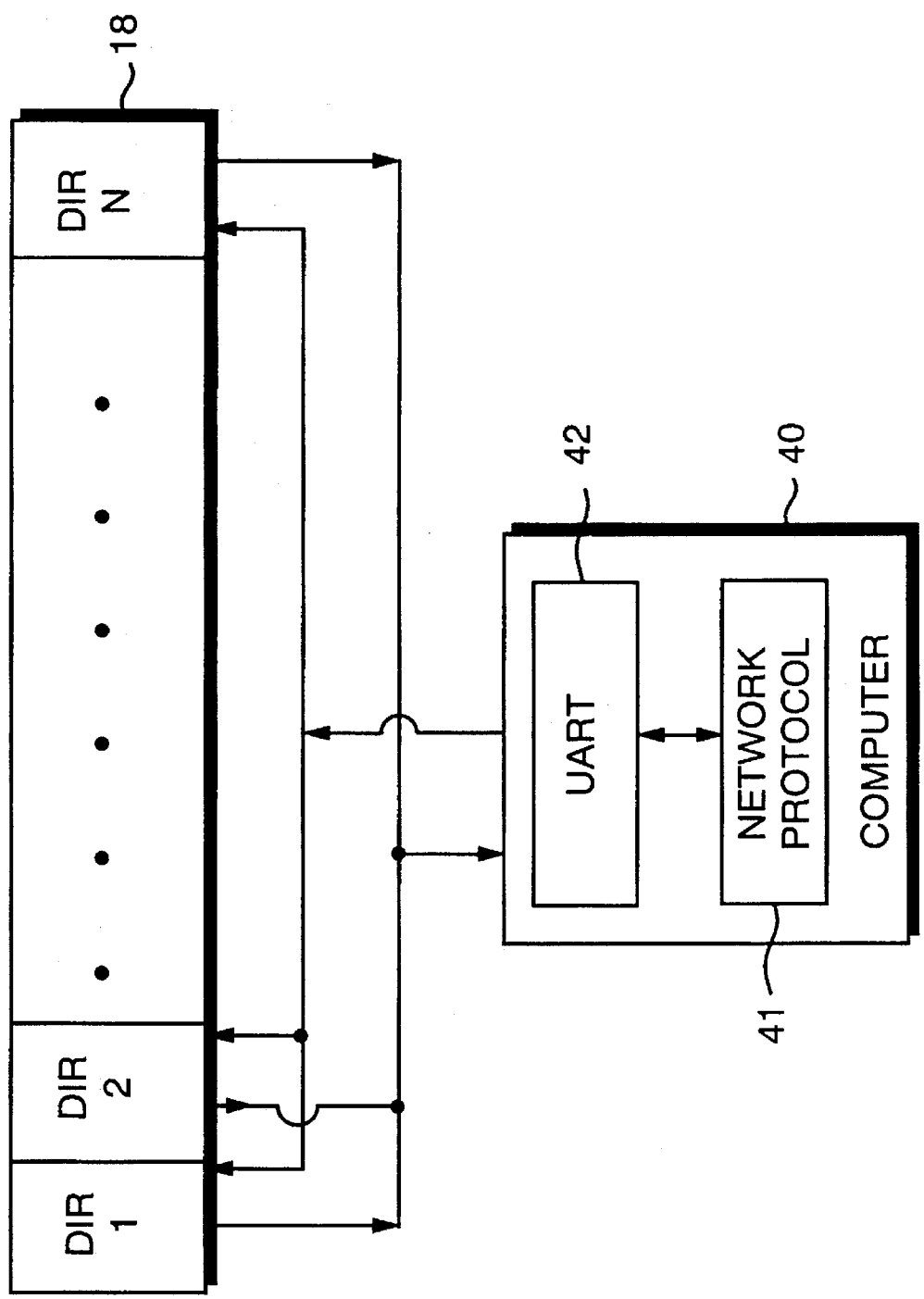
FIG. 2 is a schematic diagram of the physical network between the test computer and the directors of FIG. 1 for accomplishing this invention.

FIG. 2 is a schematic block diagram of the system including directors 50, labelled directors 1 through N. The directors are connected to external PC 40 which accomplishes two way communications through UART 42. This network style simplifies the wiring required to accomplish the communications. Each director or CPU on the system assumes a node number which is configured by the software from each node's hardware.

The network protocol 41 uses two unique eight bit tokens to control the flow of data through the system. A first data transmission token, called a "T2" token herein, is passed under control of computer 40 from the computer to one active node (director), back to the computer, and then to the next active node, and so forth. The computer 40 controls the frequency of the token passing, the nodes to which the token is passed, and the order of the passing.

Since anything transmitted from computer 40 to any one node or director will be received by each director, this token must be properly addressed to the intended addressee node/director. The addressee director must then return the token to the computer, and may only communicate with the computer when it has possession of the T2 token. The director may append to or include with the token a status message, or append data which it needs to transmit to the computer 40.

A second token, labelled "T1", is the token used by computer 40 to send data to one or more of the directors. As with the T2 token, this T1 token must be addressed to a specific and intended addressee node, as it will be received by all of the directors. To speed operation of the network and allow for full duplex communication, the system is configured to insert the T2 token one or more times between bytes of a data stream appended to a T1 token. This has the effect of continuing the passing of the T2 token even while the computer is sending a long T1 type data stream to one of the nodes, which allows a second node to return data to the PC at the same time that the PC is sending data to the first node.

Figure 3A:
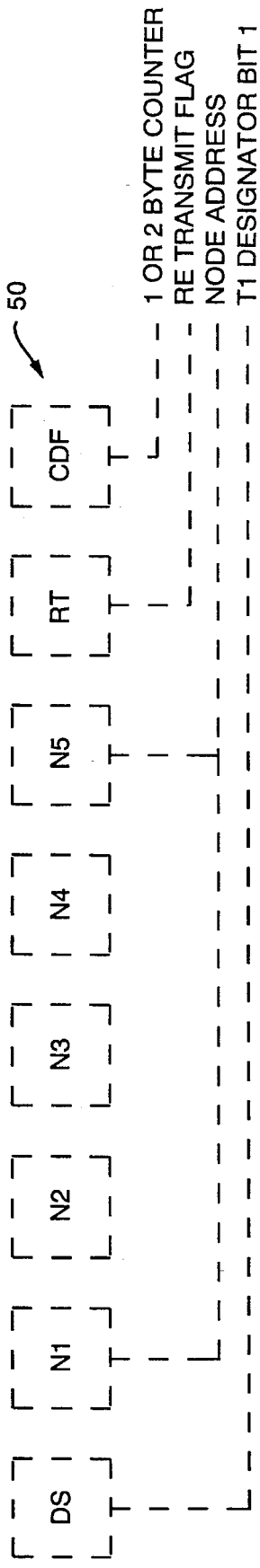
FIG. 3A is a diagram of one type of data transmission token for the preferred embodiment of the system and method of this invention.

The second token, the T1 token, is depicted in FIGS. 3A and 3D. FIG. 3A is a diagram of the token that is addressed to a single node. FIG. 3D is a similar diagram for a global transmission; a token addressed to all of the nodes. The token is eight bits long. A node which sees a T1 token addressed to it knows that a data stream follows the token and is addressed to that node. The two types of data streams of the preferred embodiment of this invention are shown in FIGS. 3B and 3C.

T1 token 50, FIG. 3A, begins with T1 designator bit DS, which, when set (1) identifies the token as a T1 token as opposed to a T2 token. The next five bits (N1–N5) are reserved for the node address. The seventh bit is a retransmit flag, which is set if this is a retransmission of data. This would be the case if the addressee node had previously sent a not-acknowledged message along with the last T2 token it transmitted, indicating that the previous, identical message from the PC, had not been properly received. The last bit (CDF) is a bit which indicates which of the two types of data streams is appended to the token, that is, whether the data stream includes a one byte counter (FIG. 3B) or a two byte counter (FIG. 3D) further explained below in conjunction with FIGS. 3B and 3C.

Figure 3B:
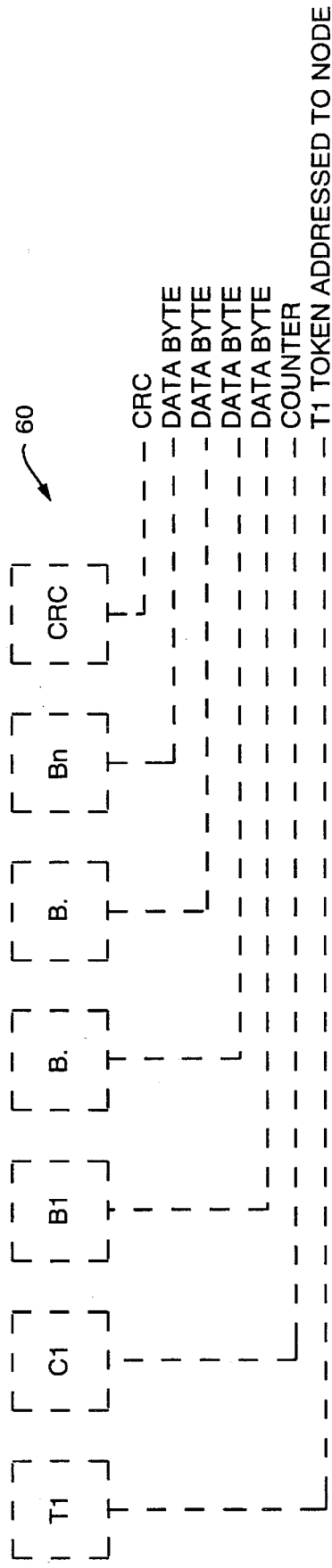

An example of one type of T1 data stream 60, FIG. 3B, allows for a $2^8$ data bytes and includes just after the T1 token a counter byte labelled C1 which gives the number of data bytes, labelled B1 through BN, which immediately follow the counter byte. Each data byte comprises eleven bits; a start bit, eight bits of data, a parity bit, and a stop bit. The parity bit is set to signify a token. The final byte is a check byte or checksum labeled CRC. The size of data stream 60 can thus be calculated as: C1 the number of data bytes plus 3, where the constant 3 is the token byte, the counter byte, and the CRC byte. Accordingly, data stream 60 can be up to 259 bytes long ($2^8$=256+3=259).

A second type of T1 data stream 70, FIG. 3C, reserves two bytes for the counter, the first byte for the high end counter byte, and the second byte for the low end counter byte, to allow transmission of up to $2^{16}$ data bytes. Immediately following the counter are the data bytes and the checksum labled CRC.

To accomplish a global transmission to all of the nodes, the PC 40 sends T1 token 80, FIG. 3D. This token also starts off with the T1 designator bit labelled DS. A node address of 1F (hex) (all bits set) designates a global T1 token which is read by all of the active nodes on the network. The token byte then ends with the retransmission flag bit and a one or two byte counter bit (CDF) as described in conjunction with FIG. 3A.

Figure 4C:
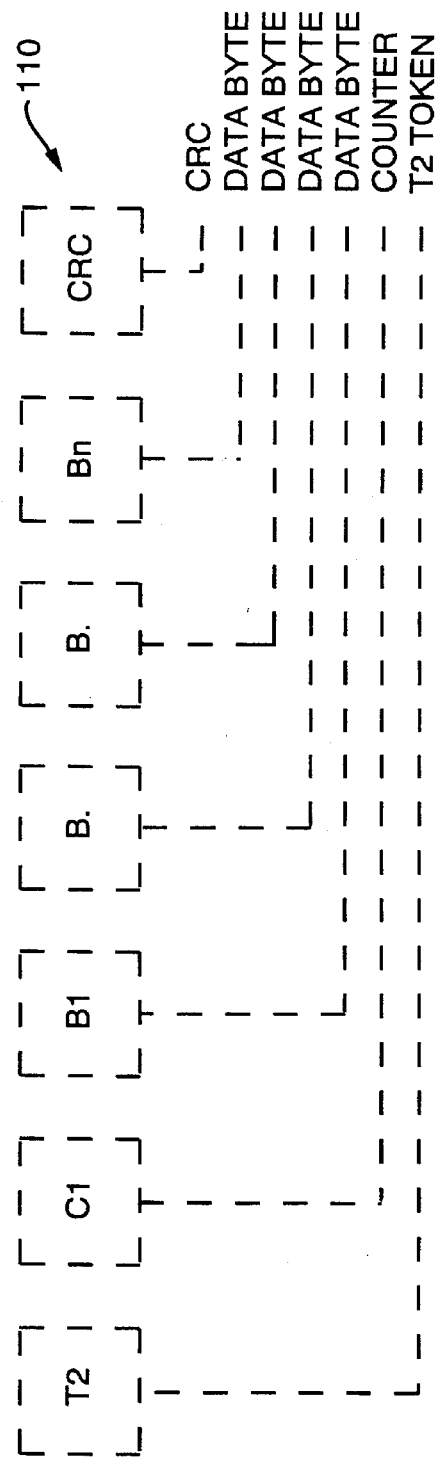
FIG. 4C is a schematic diagram of a data train appended to the token of FIG. 4B.
Figure 4D:
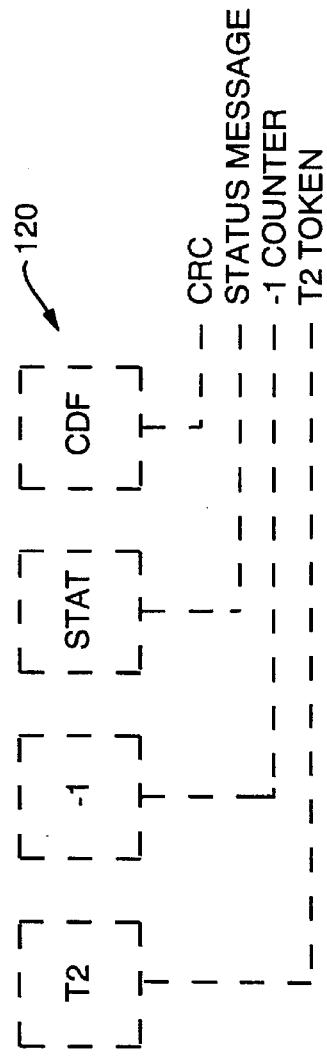
FIG. 4D is a schematic diagram of a status message appended to the token of FIG. 4B.

The T1 token is always transmitted from the PC to a node, and is never returned from the node to the PC, as the node may only communicate with the PC when it is in possession of the T2 token. There are two types of T2 tokens used in the network of this invention. A $T2_A$ token transmitted4 from the PC to the node is shown in FIG. 4A, and the return $T2_B$ token, transmitted from the node to the PC, is shown in FIG. 4B. If the node needs to communicate more than a two bit status, it may append a data stream or a status message to the T2 token, as shown in FIGS. 4C and 4D, respectively.

$T2_A$ token 90, FIG. 4A, transmitted to the node starts with a T2 designator bit set to zero (0), followed with five bits for the node address. The final bit is an acknowledge/not acknowledge flag by which the PC communicates to the node whether it has successfully received the last polling cycle from the node being addressed.

The return $T2_B$ token 100, FIG. 4B, is sent to the PC by the node which has just received token 90 from the PC. As the returning token must by definition be destined for the PC, it would not technically need to be addressed. And, as the PC knows to which node it just handed the token, the token technically would not need to be signed with the node's address. However, for troubleshooting and debugging purposes, the nodes in this exemplary embodiment do sign the token, although this is not necessary for the invention. If a node fails to respond to transmission of T2 token 90 within a specific time frame, the PC should assume that the node is off line, and after that may periodically try to re-establish communications by re-transmitting the T2 token to that node.

Return $T2_B$ token 100, FIG. 4B, begins with a DTF bit which indicates whether or not a data stream follows. If no more than a single byte of data follows the $T2_B$ token, the DTF bit is set to zero. The next bit is called a single character bit. If this bit is set to one, a single byte of data follows the $T2_B$ token. No checksum byte is appended to the byte in this case, which is not specifically illustrated herein. The next four bits are reserved for the node to sign its address. The final two bits are an acknowledge/not acknowledge and traffic activity state indicator. This is a two bit status indicating whether the acknowledge/not acknowledge part of the status applies to a just received message. Preferably, these bits are employed as follows:

TABLE 1

| | |
|---|---|
| 00 | acknowledge, but no completed message since last T2 |
| 01 | acknowledge, message received since last T2 |
| 10 | acknowledge and busy |
| 11 | not acknowledge, message received since last T2 |

The single type of T2 data stream employed in this embodiment of the invention is shown in FIG. 4C. Data stream 110 starts with the $T2_B$ token 100, FIG. 4B. The next byte is an eight bit counter for the number of data bytes B1 through BN which are to follow. The last byte is a checksum byte. The length of the data stream and the token can be calculated as: counter value plus three (3), where the constant three is the token byte, the counter byte, and the calculated checksum byte. Accordingly, the data stream length cannot exceed 256 plus three bytes however 2 bytes of the data stream are reserved for future use.

When the node desires to send a one-byte status message, the form of the data stream is as shown in FIG. 4D. Data stream 120 includes the $T2_B$ token followed by a −1 counter which indicates that a status message follows. The CRC byte is used in this case.

The status messages are:

TABLE 2

| | |
|---|---|
| 1 | node going off line |
| 2 | node reset state |
| 3 | incorrect counter (T1 received during data transmission) |
| 4 | timed out between character reception |

Figure 5:
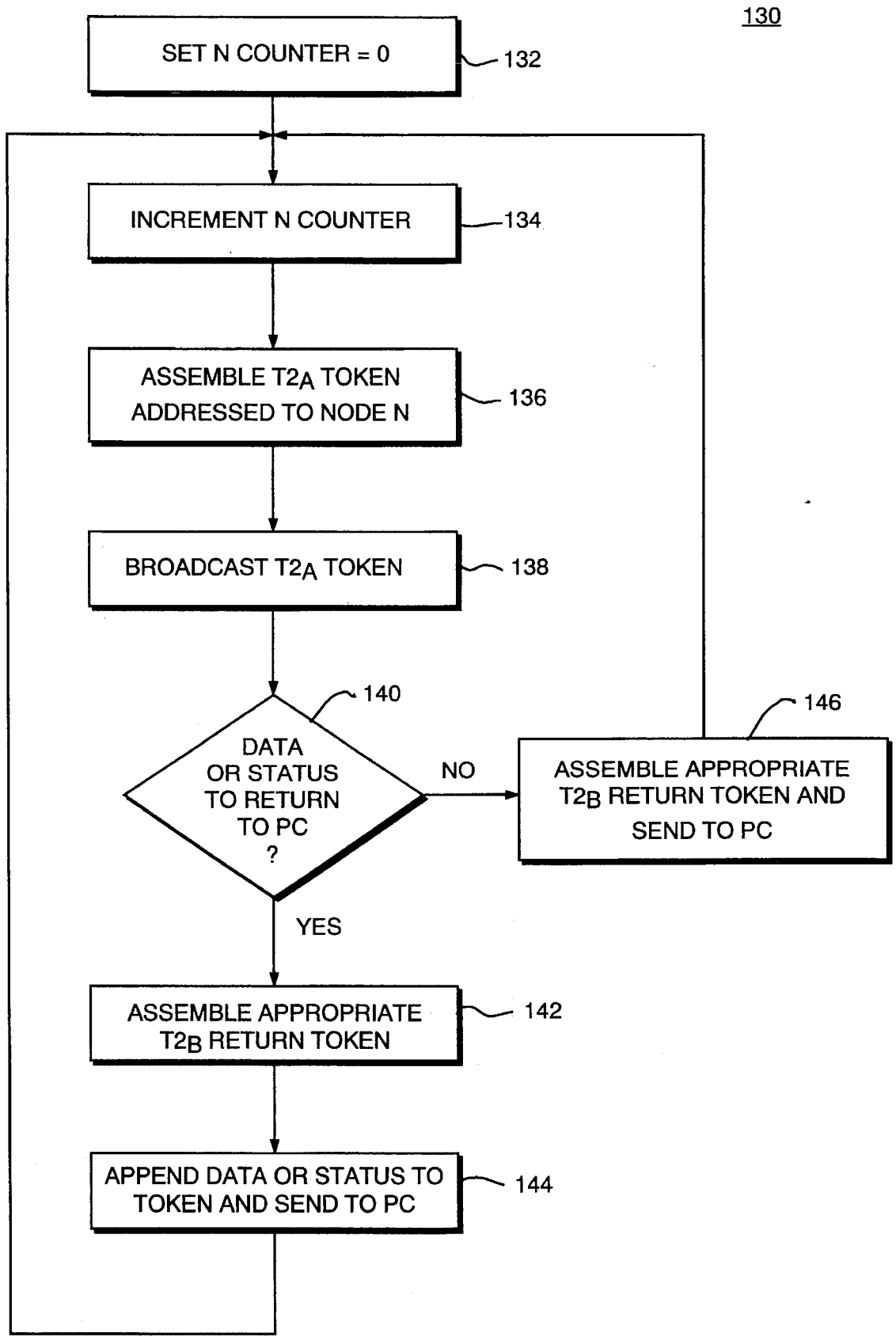
FIG. 5 is a flow chart detailing the preferred manner in which the PC passes the token of FIGS. 4A and 4B to and from each director.
Figure 6:
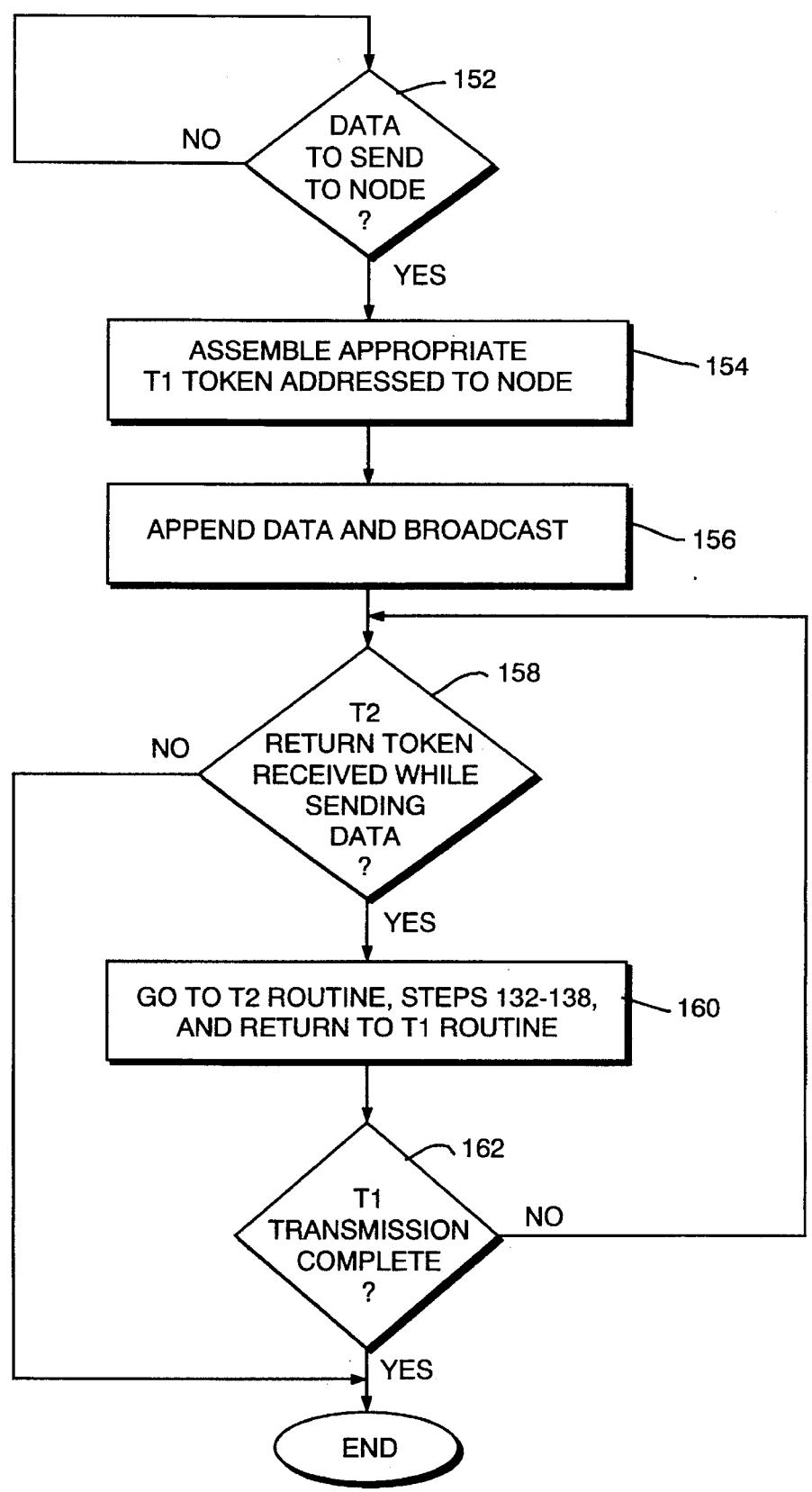
FIG. 6 is a flow chart of the preferred manner in which the token of FIG. 3A is used to transmit data to a director.

One exemplary manner in which the T2 and T1 tokens are used to communicate data and status messages to and from the PC and all of the active nodes in the network are shown in the flow charts of FIG. 5 and FIG. 6. The T2 passing routine 130, FIG. 5, starts by setting the node counter N equal to zero, step 132. The counter is then incremented, step 134. As explained previously, only active nodes are addressed. For the sake of simplicity in this flowchart, it is assumed that each of the active nodes has the next sequential integer address although this is not a limitation of the present invention. In this manner, each node sequentially has an opportunity to transmit data to the PC.

The PC then assembles the $T2_A$ token addressed to node N, step 136 as shown at 90, FIG. 4A. This token is then broadcast to all of the nodes, step 138. Only the node to which the token is addressed will read the token. The addressee node then determines whether it has data or a status message to return to the PC, step 140. If it does not, it assembles the appropriate $T2_B$ return token 100, FIG. 4B, and returns the token to the PC, step 146. The PC then increments the N counter and sends the token to the next active node.

If the node has data or a status message to return to the PC, it assembles the appropriate $T2_B$ return token (100, FIG. 4B) step 142, and appends the data or status to the token and sends it to the PC, step 134. These two types of data streams are illustrated in FIGS. 4C and 4D.

T1 passing routing 150, FIG. 6, begins when the PC determines that it has data to send to one or more nodes, step 152. When it does, the appropriate local or global T1 token, shown in FIGS. 3A and 3D, respectively, is assembled and addressed to the appropriate node, step 154. The data is then appended to the token and the data stream is broadcast, step 156. The two types of T1 data streams are shown in FIGS. 3D and 3C.

Figure 7:
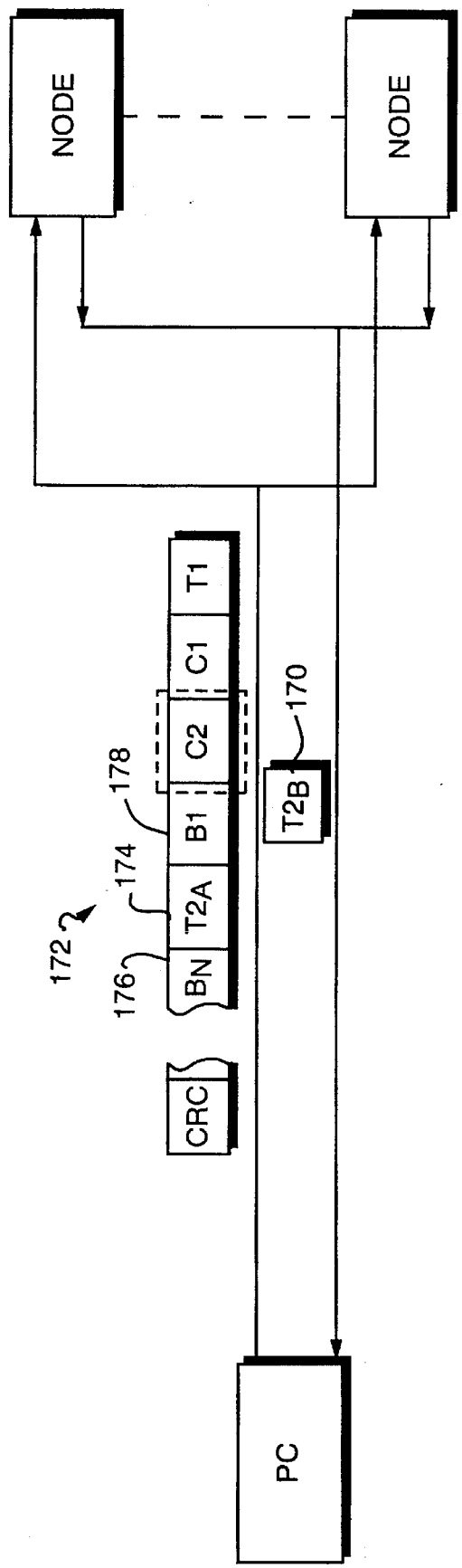
FIG. 7 is a block diagram illustrating full duplex communication according to one feature of the present invention.

If the PC has received a $T2_B$ return token from another node not being addressed by the T1 token 170, FIG. 7, while transmitting a T1 data stream 172, step 158, the PC can insert a $T2_A$ token 179 between data bytes 176, 178 of the data stream so that the sending of data from the PC to a node does not substantially slow the transmission of data from other nodes to the PC. By passing the $T2_A$ token to nodes not receiving T1 data while one node is receiving a T1 data stream, this invention provides full duplex communications.

It is possible for a $T2_A$ token to appear many times within the transmission of a T1 data stream. T1 and $T2_A$ tokens, however, cannot appear sequentially. Since data bytes have a parity bit, any node not currently receiving a T1 data stream will ignore any bytes having the parity bit set. This allows the data-receiving node to continue to receive data unaffected by the physical interruption of the data flow with one or more $T2_A$ tokens at various intervals in the data transfer.

The insertion of a $T2_A$ token in a T1 data stream is accomplished by going to steps 132 through 138 of routine 130, FIG. 5, each time the PC desires to insert a T2 token into the T1 data stream. Operation of sending a T1 data stream then returns to step 160, FIG. 6. This procedure repeats until the T1 data stream has been completely transmitted, step 162.

Because the network protocol is so well defined, transmission integrity need not be exhaustively checked. In order to keep overhead rates relatively low, integrity checking is accomplished with a single checksum byte for each data buffer passed through the system. The checksum is compared to the last transmitted byte of the transmission. If the calculated checksum and the transmitted checksum are the same, an acknowledge signal is transmitted back to the originator at the first available opportunity. If they are not the same, a not acknowledge signal must be returned. For data moving from the PC to a node, the node must return the acknowledge or not acknowledge signal on the next $T2_B$ token returned. The PC accordingly will not send another data buffer to this node until it has received an acknowledge signal from the node.

Accordingly, the present invention provides a highly efficient, well defined, full duplex communication protocol for a network system which is easily implemented and achieves significant improvements in data and communication transfer rates between a central controller like a PC, and multiple connected nodes.

Modifications and substitutions by one of ordinary skill in the art are considered to be within the scope of the present invention which is not to be limited except by the claims which follow.

We claim:

1. A method of providing a network communication protocol, for controlling communications between a central controller and a plurality of other controllers, said method comprising the steps of:

passing a first data transmission token (T2), under control of said central controller, from the central controller to at least a first other controller, from said at least a first other controller back to the central controller, and then from said central controller to and from each remaining other of said plurality of controllers, whereby any of said plurality of other controllers is allowed to return data to the central controller only appended to said first data transmission token (T2); and broadcasting a second data transmission token (T1) addressed to one of said plurality of other controllers from said central controller to all of said plurality of other controllers, said second data transmission token (T1) further including a data stream, appended to said second data transmission token (T1), said second data transmission token (T1) and said appended data stream to be transmitted from said central controller to said addressed controller; and inserting said first data transmission token (T2) into said data stream appended to said second token (T1), to allow said first data transmission token (T2) to be passed more regularly between said central controller and said plurality of other controllers, to facilitate full duplex communication.

2. The method of claim 1, wherein the step of passing said first data transmission token (T2) includes addressing said first data transmission token (T2) to a selected one active embedded controller and broadcasting said addressed first data transmission token (T2) to each of said plurality of coupled active embedded controllers.

3. The method of claim 1, wherein at least one of said plurality of coupled embedded controllers includes a director in a data storage system.

4. The method of claim 1, wherein said data returned by an active embedded controller with the first data transmission token (T2) is divided into at least one eleven bit byte.

5. The method of claim 4, wherein said at least one eleven bit data byte includes eight data bits.

6. The method of claim 5, wherein said data byte includes a start and a stop bit immediately before and after said eight data bits, respectively.

7. The method of claim 6, wherein said data byte further includes a parity bit immediately after said stop bit.

8. The method of claim 1, wherein the step of broadcasting said second data transmission token (T1) with appended data includes inserting a data byte counter between said second data transmission token (T1) and the data to communicate the number of data bytes to follow the data byte counter.

9. The method of claim 8, wherein the step of broadcasting said second data transmission token with appended data further includes adding a checksum at the end of said data bytes.

10. The method of claim 8, wherein said data byte counter is one byte in length.

11. The method of claim 8, wherein said data byte counter is two bytes in length, a first byte of said two byte data byte counter being the high end byte of the data byte counter, and a second byte being a low end byte of said data byte counter.

12. The method of claim 1, wherein the step of passing the first data transmission token (T2) includes following the first data transmission token (T2) passed from an active embedded controller back to the central controller with a bit indicating whether only a single byte or more than one single byte of data follows said first data transmission token (T2).

13. The method of claim 1, wherein the step of allowing an active embedded controller to return data back to said central controller includes inserting a data byte counter between said first data transmission token (T2) and appended data, to communicate to the central controller the number of data bytes to follow.

14. A method of providing a controller network communication protocol, for controlling communications between a central controller and a plurality of other controllers, said method comprising the steps of:

(a) addressing a first data transmission token (T2) to one of said plurality of other controllers;

(b) broadcasting the addressed first data transmission token (T2) to all of said plurality of other controllers;

(c) awaiting for said addressed other controller to return said first data transmission token (T2) to the central controller with one of a status message or a data stream appended to said first data transmission token;

(d) repeating steps (a) through (c) for each one of said plurality of said other controllers, to allow each said plurality of other controllers to periodically communicate with the central controller;

(e) addressing a second data transmission token (T1) to one of said plurality of other controllers;

(f) appending a string of data bytes to said second data transmission token (T1);

(g) broadcasting said second data transmission token (T1) and appended data steam to all of the plurality of other controllers; and (h) inserting at least one said first data transmission token (T2) between data bytes of said appended to said second data transmission token (T1) data stream to accomplish step (b) more regularly and to provide full duplex communication between said central controller and said plurality of coupled active embedded controllers.

15. A controller network system providing for communications between a central controller and a plurality of other controllers, said system comprising:

means for passing a first data transmission token (T2), under control of said central controller, form the central controller to one of said plurality of other controllers, back to the central controller, and then from the central controller to and from each of said plurality of other controllers, whereby said any other controller is allowed to return data to the central controller only appended to said first data transmission token (T2); and means for broadcasting a second data transmission token (T1) address to one of said plurality of other controllers from the central controller to all of the other controllers, said second data transmission token (T1) including a data stream to be transmitted from the central controller to said predetermined one addressed active embedded controller appended to said second data transmission token (T1), said means for broadcasting further including means for inserting said first data transmission token (T2) into the data stream appended to the second data transmission token (T1), to allow the first data transmission token (T2) to be passed more regularly between said central controller and said other controllers, to facilitate full duplex communication.

16. The system of claim 15 in which said means for passing the first data transmission token (T2) includes means for addressing said first data transmission token to one selected active embedded controller and broadcasting the addressed first data transmission token to all of said plurality of coupled active embedded controllers.

17. The system of claim 15, wherein at least one of said plurality of coupled active embedded controllers includes a director in a data storage system.

18. The system of claim 15, wherein said data returned by an active embedded controller with said first data transmission token (T2) is divided into at least one eleven bit byte.

19. The system of claim 18, wherein said at least one eleven bit data byte includes eight data bits.

20. The system of claim 19, wherein said data byte includes a start and a stop immediately before and after said eight data bits, respectively.

21. The system of claim 20, wherein said data byte includes a parity bit immediately after said stop bit.

22. The system of claim 15, wherein said means for broadcasting the second data transmission token (T1) with appended data includes means for inserting a data byte counter between the second data transmission token (T1) and the data, to communicate the number of data bytes to follow the data by the counter.

23. The system of claim 22, wherein said means for broadcasting the second data transmission token (T1) with appended data further includes means for adding a checksum at the end of said data bytes.

24. The system of claim 22, wherein said data byte counter is one byte long.

25. The system of claim 22, wherein said data byte counter is two bytes in length, a first byte of said two byte data byte counter being the high end byte of said data byte counter, and a second byte being a low end byte of a data byte counter.

26. The system of claim 15, wherein said means for passing said first data transmission token (T2) includes means for beginning the first data transmission token (T2) passed from an active embedded controller back to the central controller with a bit indicating whether only a single byte or more than one single byte of data follows said first data transmission token (T2).

27. The system of claim 15, wherein said means for allowing an active embedded controller to return data back to said central controller includes means for inserting a data byte counter between said first data transmission token (T2) and the appended data, to communicate to the central controller the number of data bytes to follow.

28. An embedded controller network communication system for controlling communications between a central controller and a plurality of coupled active embedded controllers, comprising:

means for sequentially addressing a first data transmission token (T2) to each of said plurality of coupled active embedded controllers;

means for sequentially broadcasting a plurality of the addressed first data transmission tokens (T2) one at a time to all of the plurality of active embedded controllers;

means for awaiting for each said addressed active embedded controller which has received a token to return the first data transmission token (T2) to the central controller with one of a status message or a data stream appended to the first data transmission token (T2);

means for addressing a second data transmission token (T1) to an active embedded controller;

means for appending a string of data bytes to the second data transmission token (T1) by said central controller;

means for broadcasting the second data transmission token (T1) and appended data stream to all of the plurality of coupled active embedded controllers; and means for periodically inserting said first data transmission token (T2) between data bytes of said appended data stream to pass said first data transmission token (T2) more regularly and to provide full duplex communication between said central controller and said plurality of coupled active embedded controllers.

29. The system of claim 28 wherein said central controller includes a computer.

30. A method of providing a network communication protocol, for controlling communications between a central controller and a plurality of other controllers, said central controller adapted for broadcasting a first data transmission token (T2) addressed to at least a first one of said plurality of other controllers to each of said plurality of other controllers, and for receiving said first data transmission token (T2) from said at least a first one of said plurality of other controllers, whereby any of said plurality of other controllers are allowed to return data to the central controller only appended to said first data transmission token (T2), said method comprising the steps of:

broadcasting a second data transmission token (T1) addressed to one of said plurality of other controllers from said central controller to all of said plurality of other controllers, said second data transmission token (T1) further including a data stream, appended to said second data transmission token (T1), said second data transmission token (T1) and said appended data stream to be transmitted from said central controller to said addressed controller; and inserting said first data transmission token (T2) into said data stream appended to the second data transmission token (T1), to allow said first data transmission token (T2) to be passed more regularly between said central controller and said plurality of other controllers, to facilitate full duplex communication between said central controller and said other controllers.

31. A controller network system providing for communications between a central controller and a plurality of other controllers, said system comprising:

means for broadcasting a first data transmission token (T2) addressed to at least a first one of said plurality of other controllers from said central controller to said plurality of other controllers, and for receiving said first data transmission token (T2) from said at least a first one of said plurality of other controllers, whereby said plurality of other controllers are allowed to return data to the central controller only appended to said first data transmission token (T2); and means for broadcasting a second data transmission token (T1) addressed to at least one of said plurality of other controllers from the central controller to all of said other controllers, said second data transmission token (T1) including a data stream to be transmitted from the central controller to said at least one addressed controller appended to said second data transmission token (T1), said means for broadcasting further including means for inserting said first data transmission token (T2) into said data stream appended to the second data transmission token (T1), to allow said first data transmission token (T2) to be passed more regularly between said central controller and said other controllers, to facilitate full duplex communication between said central controller and said plurality of other controllers.

* * * * *